United States Patent [19]

Grabow

[11] 4,128,006
[45] Dec. 5, 1978

[54] PACKAGING OF PRESSURE SENSOR CELLS
[75] Inventor: Ronald D. Grabow, Delavan, Wis.
[73] Assignee: Bunker Ramo Corporation, Oak Brook, Ill.
[21] Appl. No.: 749,809
[22] Filed: Dec. 13, 1976
[51] Int. Cl.² .......................................... G01L 9/12
[52] U.S. Cl. .................................. 73/724; 73/729
[58] Field of Search ............... 73/398 C, 393, 410, 73/431, 386, 387, 724, 718, 729; 361/283

[56] References Cited
U.S. PATENT DOCUMENTS

| 2,216,374 | 10/1940 | Martin | 73/393 |
| 2,879,802 | 3/1959 | Bois | 73/410 |
| 2,999,385 | 9/1961 | Wolfe | 73/398 C |
| 3,808,480 | 4/1974 | Johnston | 73/398 C |
| 4,040,118 | 8/1977 | Johnston | 73/398 C |

Primary Examiner—Donald O. Woodiel
Attorney, Agent, or Firm—F. M. Arbuckle; L. T. Steadman

[57] ABSTRACT

A pressure capsule is shock mounted in a pressure chamber formed within a metal housing and is isolated from the environment of the pressure to be sensed by a sealing structure which is a part of the capsule mounting apparatus. The capsule includes a pair of electrical leads which extend in sealed relation into another part of the housing so as to be isolated from the deleterious effects of moisture and electric fields. The pressure chamber includes a fluid passageway which connects both sides of the pressure transducer to the pressure being sensed and includes radially extending and axially extending portions in the sealing structure. The chamber is formed by a pair of plates, each of which includes a recess and one of the plates is mounted against shoulders on the other plate to minimize assembly pressure and warping of the pressure capsule.

26 Claims, 12 Drawing Figures

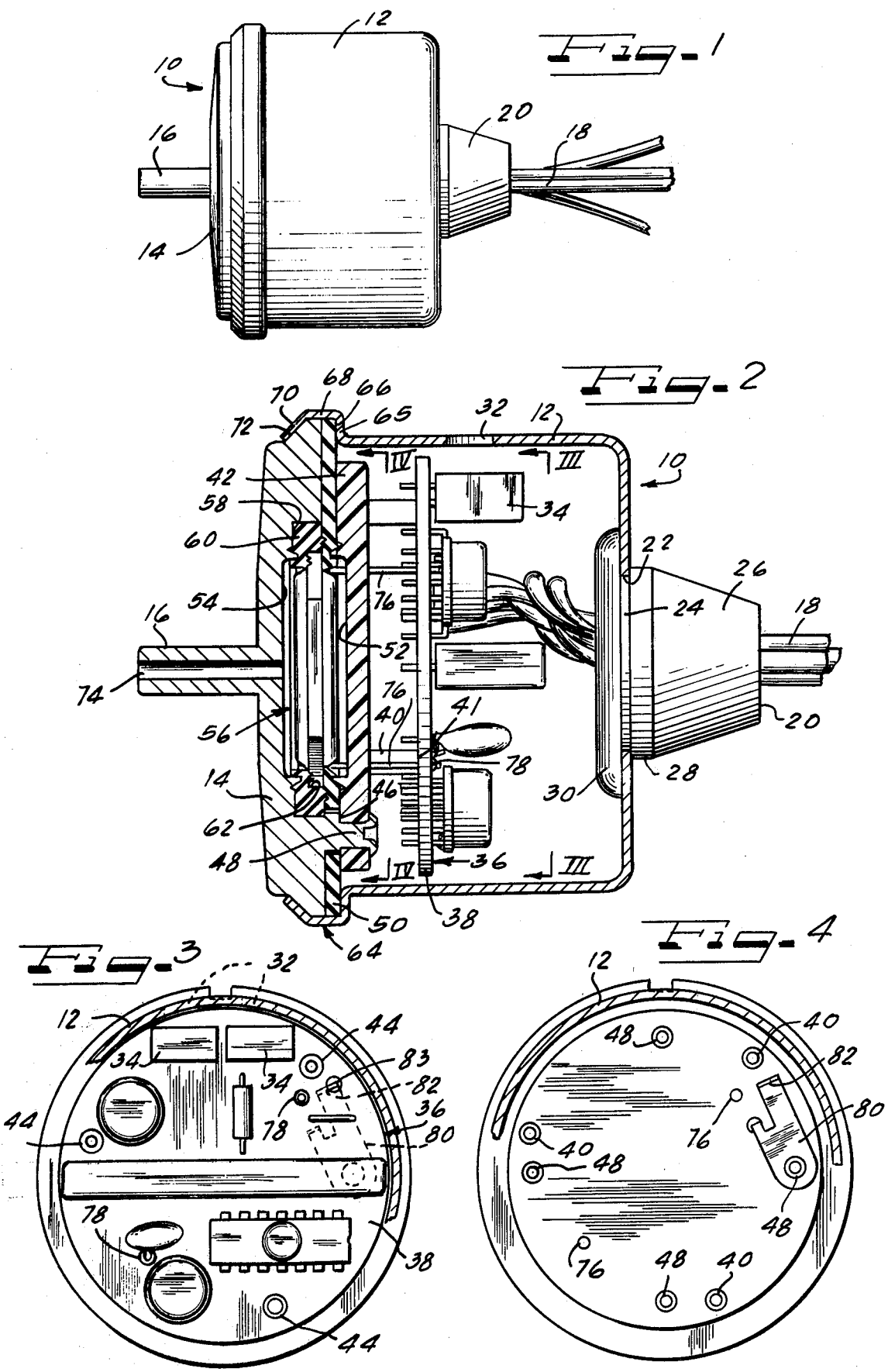

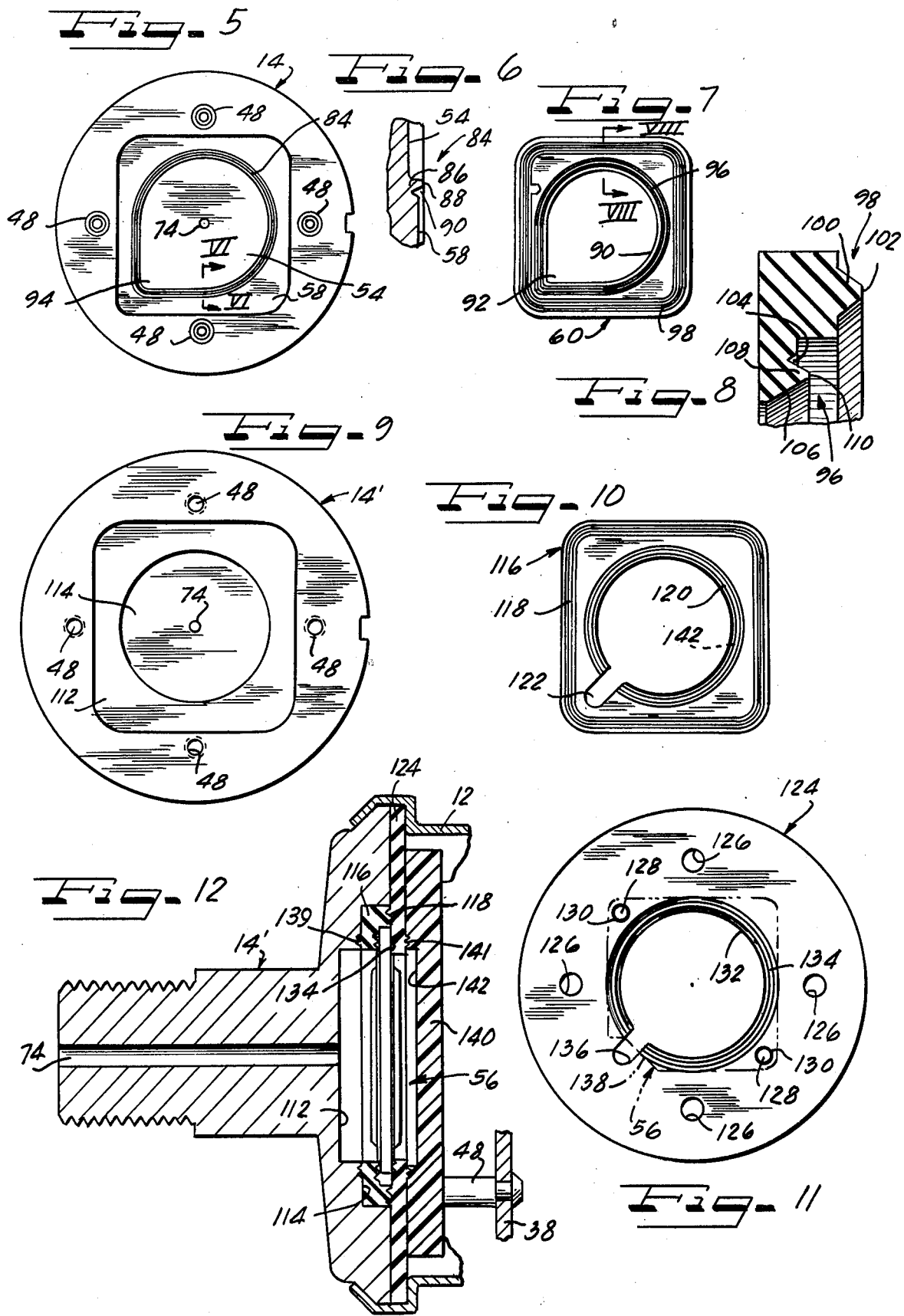

PACKAGING OF PRESSURE SENSOR CELLS

BACKGROUND OF THE INVENTION

1. Field of the Invention

This invention relates to pressure sensor apparatus, and more particularly to packaging of a pressure sensor cell.

2. Description of the Prior Art

In U.S. Pat. No. 3,808,480, Samuel Andrew Johnston discloses a capacity pressure transducer which has a pair of pressure responsive diaphragms as one set of capacitor plates which move with respect to respective fixed capacitor plates to constitute variable capacitors. In this construction, a substrate carries the fixed plates and, insulated from the fixed plates, a pair of cup-shaped pressure deformable diaphragm plates. The capacitance is connected in an electrical circuit which converts the varying capacitance to a correspondingly varying electrical signal. If the variable capacitor is part of an oscillator, the changes in pressure cause corresponding changes in the operating frequency of the oscillator and the variable frequency output signal can be processed by a discriminator or the like to obtain an analog output signal or by a counter to obtain a digital output signal, as disclosed in U.S. Pat. Nos. 3,295,360 and 3,595,084.

The variable capacitance disclosed by Johnston is mounted in a sealed chamber which has a pressure port for communication with a source of pressure which is to be monitored. Inasmuch as the pressure sensor cell disclosed by Johnston and the circuits disclosed by Johnston and in U.S. Pat. Nos. 3,295,360 and 3,595,084 may be utilized in practicing the present invention, these patents are fully incorporated herein by this reference.

Inasmuch as pressure sensors are finding use in a wide variety of applications, it is necessary, for certain applications, to provide an environmentally isolated, shock absorbing package for a pressure sensor cell, while at the same time providing for simultaneous pressure and/or vacuum detection on both diaphragms.

SUMMARY OF THE INVENTION

In veiw of the foregoing, it is the primary object of the invention to provide an enivronmentally isolated, shock absorbing package for a pressure sensor cell.

Another object of the invention is to provide a package for a pressure sensor cell which has a single port by which pressure and/or vacuum is simultaneously detected on both diaphragms.

According to the invention, the pressure sensor cell is shock mounted in a resilient material, for example rubber, about its periphery within a chamber formed by a pair of opposed recesses in a mounting plate and a substrate base, respectively. The shock mounting of the sensor cell accomplishes: a reduction in the g forces transmitted to the cell under vibrations; a reduction in forces on the cell due to thermal expansion and contraction; and an effective seal of the cell from the outside environment with minimum pressure on the assembly.

Isolation of the cell from the outside environment by sealing is accomplished through the utilization of small sealing beads which reduces the total assembly pressure required to achieve the seal.

The mounting plate is provided with a fluid passageway which is in communication with the recess in the mounting plate and includes shoulders which act as a positive stop with respect to the substrate base thereby limiting the pressure that can be applied to the sensor during assembly. By limiting the assembly pressure, elimination or a substantial reduction in the possibility of substrate warping is achieved; consequently, a subsequent change of capacitance that would result from such warping is eliminated, or at least substantially reduced.

Moisture on the leads which extend from the sensor cell to the associated electrical circuitry can cause a drift of the capacitance. According to the present invention, the cell output leads are effectively isolated from the area which is undergoing a pressure change by locating the leads outside of the sealing beads. Thus, moisture which may enter through the pressure port is blocked and is ineffective to cause such a capacitance drift.

The aforementioned beads on gaskets to effect the seal, permit sealing to be effected with light assembly procedures, thereby keeping pressures on the substrate at a minimum and at a rather constant level. The shoulders mentioned above are provided on staking posts which extend from the mounting plate and prevent the substrate base from being staked at a wide range of assembly pressures. This relatively constant pressure on the substrate minimizes its deflection through its useful temperature range, thereby preventing the capacitive output of the cell from being influenced by substrate warpage.

The mounting plate constitutes an end cap for a metal can-shaped housing and the mounting plate and housing provide a capacitive shield about the cell.

Advantageously, an associated electronic circuit, such as an oscillator, is carried on a printed circuit board within the housing and parallel to, but spaced from, the substrate base. The substrate base includes a plurality of staking posts projecting therefrom for spacing and securing the printed circuit board.

Inasmuch as the associated electrical circuit may include adjustable components, such as variable resistors or capacitors, the housing may be provided with apertures aligned with such variable components for access thereto for adjustment. After adjustment of the variable components, such apertures may be covered and the housing sealed with an adhesive component, which may also function as a label which bears indicia indentifying the pressure sensor and its specifications.

Inasmuch as it is necessary to provide power connections to the printed circuit board and to extend output leads therefrom, the housing may also be provided with an aperture for power and output signal leads, and such leads may extend through the aperture via a seal, such as a rubber grommet.

BRIEF DESCRIPTION OF THE DRAWINGS

Other objects, features and advantages of the invention, its organization, construction and operation will be best understood from the following detailed description, taken in conjunction with the accompanying drawings, in which:

FIG. 1 is an elevational view of a pressure sensor package constructed in accordance with the present invention;

FIG. 2 is a sectional elevational view of the apparatus illustrated in FIG. 1;

FIG. 3 is a sectional view taken substantially along the lines III—III in FIG. 2;

FIG. 4 is a sectional view taken substantially along the lines IV—IV of FIG. 2;

FIG. 5 is a plan view of the interior wall of the mounting plate of the apparatus illustrated in FIG. 2;

FIG. 6 is a sectional view taken substantially along the line VI—VI of FIG. 5;

FIG. 7 is a plan view of a gasket which is received in the mounting plate illustrated in FIG. 5;

FIG. 8 is a sectional view taken substantially along the line VIII—VIII in FIG. 7;

FIG. 9 is a plan view of a different mounting plate which may be utilized in practicing the present invention;

FIG. 10 is a plan view of a gasket for use with the mounting plate of FIG. 9;

FIG. 11 is a plan view of a gasket which may be employed in the structure illustrated in FIGS. 2 and 13;

FIG. 12 is a fragmentary sectional view of the apparatus of FIGS. 9, 10 and 11 assembled, together with a pressure sensor and a printed circuit board (partially illustrated).

DESCRIPTION OF THE PREFERRED EMBODIMENTS

A pressure transducer is generally illustrated at 10 as comprising a metal housing 12, a plurality of electrical leads 18 extending from the housing 12 for supplying electrical energy thereto and taking pressure indicative electrical signals therefrom, a seal 20 for providing a moisture-proof seal for the conductors 18 and a housing cover 14 which has a hollow stem 16 for receiving pressure signals. As used herein, the term "pressure" is taken to mean both positive and negative pressure, and the pressure sensor is intended to detect all types of pressure signals, including vacuum signals, depending on the particular application of the pressure sensor.

More specifically, and referring to FIG. 2, the seal 20 is made of a resilient material, such as rubber or the like, and is pressed through an aperture 22 in the housing 12 (from left to right in the drawing) until the inner surface of the housing 12 is engaged by a flange 30 of the seal 20. The seal 20 includes a conically shaped portion 26 which extends axially and radially outwardly toward the flange 30 to a cylindrical portion 28 which is greater in diameter than the diameter of the aperture 22 in the housing 12. Therefore, as the seal 20 is advanced through the aperture 22, the seal 20 is compressed until the cylindrical portion 28 passes the aperture 22, whereupon the housing material adjacent the aperture 22 extends into and is received in sealing engagement in a groove 24 which is defined by the portion 28 and the flange 30.

The pressure transducer includes an electrical circuit, such as an oscillator of the type mentioned above, such circuit being generally indicated at 36 as comprising a printed circuit board 38 which carried a plurality of electrical components includiing one or more variable components 34, such as a variable capacitor or a variable resistor. Access to the variable elements is provided by a respective aperture 32 in the side wall of the housing 12. After adjustment, such apertures are sealed, for example with an adhesive label, to protect the interior of the housing from moisture. The adhesive material may be in the form of a label which bears identifying information for the pressure sensor, such as operating specifications.

The electronic circuit 36 is mounted on and parallel to and spaced from a substrate 42 which, in turn, is mounted on and carried parallel to a mounting plate, here formed by the aforementioned cover 14. This element will hereinafter be referred to as the mounting plate. The substrate 42 includes a plurality, for example three staking posts 40 extending therefrom which have reduced diameter ends forming a shoulder 41 which bears against the underside of the circuit board 38. The reduced diameter ends extend through the circuit board 38 and are spun over, as indicated at 44 (see FIG. 3) or are ultrasonically staked to secure the printed circuit board 38 to the staking posts.

A somewhat similar construction is provided on the interior side of the mounting plate 14 wherein a plurality of, for example four, staking posts 48 are provided with reduced diameter ends defining respective shoulders 46. The reduced diameter ends extend through respective apertures in the substrate 42 and are spun over a ultrasonically staked to secure the substrate 42 to the mounting plate 14.

A particular feature of the invention resides in the provision of the staking posts with mounting shoulders, particularly in the case of a mounting of the substrate 42 to the mounting plate 14. The shoulders 46 provide a positive stop for the substrate so that the pressure capsule 56 which is mounted between the substrate and the mounting plate is not subjected to excessive pressures which could cause warping and a subsequent change of capacitance. As will be understood from the discussion below, the gasket structures of the invention require only small compressive forces to provide a pressure/vacuum seal; therefore, a limitation of the assembly pressure does not adversely effect sealing and is advantageous with respect to eliminating changes in capacitance which could arise because of warping.

A pressure capsule 56 of the type disclosed in the above-identified Johnston patent is shock mounted between the substrate 42 and the mounting plate 14. For this purpose, and to seal the entire unit with respect to moisture, a gasket 50 is interposed between the substrate 42 and the mounting plate 14, the gasket being made of rubber and having a central opening in the area of a recess 52 in one surface of the substrate 42. The recess 52, as will be evident from the discussion below with respect to seals, provides for fluid communication between the hollow stem 16 and the right-hand diaphragm of the pressure capsule 56. On the opposite side of the pressure capsule 56 the mounting plate 14 includes a similar recess 54 which is in fluid communication with the hollow stem 16 and which is countersunk, so to speak, at 58 to receive a ring-shaped gasket 60, preferably made of rubber. As illustrated on the drawing, the gasket 60 and the gasket 50 engage about the periphery of the capsule 56 so that the capsule is shock mounted. The shock mounting, as previously mentioned, is of pratical importance in that it reduces the forces on the pressure capsule due to thermal expansion and contraction, it effectively seals the capsule from the outside environment with a minimum of assembly pressure, the provision of the sealing beads reduces the total assembly pressure required to achieve sealing, and it reduces the g forces transmitted to the capsule when the same is subject to shock and vibration of the outside environment which, for example, may be as high as 25 gravational units at 1000 Hz.

The housing 12 comprises an increased diameter portion 64 having a radially extending portion 65 which engages the gasket 50 at a peripheral surface portion 66, and an axially extending portion 68 which extends axially of the device to a portion 70 which is spun over against a conically shaped surface 72 of the mounting plate 14 to seal and secure the mounting plate 14, substrate 42 and electronic circuit 36 within the housing 12. Therefore, the only portions of the pressure sensor which are subject to the sensed environment are the passageway 74 within the stem 16, and the chamber formed by the recesses 52 and 54 which houses the capsule 56. A pair of capacitor leads 76 extend from the pressure capsule 56 through the gasket 50 and the substrate 42 to the printed circuit board 38 and are soldered to the circuit board, as indicated at 78 in FIGS. 2 and 3.

Referring to FIGS. 3 and 4, a grounding terminal 80 may be connected to the metal housing 12 by way of the mounting plate 14 and the staking posts 48 and include a terminal 82 which extends toward and is connected to the printed circuit board 38 as indicated at 83.

Referring now to FIGS. 5–8, the sealing structure involved in the shock mounting apparatus of FIG. 2 will be discussed in greater detail. FIG. 5 illustrates, in a plan view, the inner surfaces of the mounting plate 14. The mounting plate 14 is preferably a die cast metal plate and comprises a bead structure 84 about the junction of the recess 54 and the countersunk recess 58. The sectional view of FIG. 6 illustrates that the bead structure 84 comprises a projection 86 which forms a flat surface bead 88 adjacent a V-shaped groove 90. As illustrated in FIG. 2, this structure, upon assembly, penetrates into the facing surface of the gasket 60.

FIG. 7 illustrates a plan view of the right-hand surface of the gasket 60 illustrated in FIG. 2. The opposite surface of this gasket, according to FIGS. 2 and 5, is flat and sealingly engages the bead structure 84 of the mounting plate 14. The surface illustrated on the drawing includes a central aperture 90 for receiving a diaphragm of the pressure capsule 56 therethrough, an inner bead structure 96 and an outer bead structure 98. FIG. 8 illustrates, in a fragmentary sectional view, one embodiment of the shape of the bead structures 96 and 98. The bead structure 98 is illustrated as comprising a projection 100, of generally trapezoidal shape, having an outer surface 102 which engages and bears against a facing surface portion of the gasket 50. The bead structure 96 includes another generally similarly shaped projection 108 which is formed by a V-shaped notch 104 and an oblique surface 106 to have a flat surface 110 for engaging a peripheral surface portion of the capsule 56, as illustrated in FIG. 2. The gasket 60 is received in the countersunk recess portion 58 of the mounting plate 14. It should be noted that the shape of the bead structure 84 and the shape of the aperture 90 and bead structure 96 is generally circular with a squared-off portion which forms a tear drop shape at 92 and 94 so that the recess portion 54 communicates with the recess 52 in the substrate 42 when the capsule 56 has a corresponding corner removed or a bore therethrough in the area 92, 94. With the side of the substrate 42 shaped complementary to the recess and bead structure 54, 84 of the mounting plate 14 as illustrated in FIG. 5, it is readily apparent that the environment of the pressure being sensed is only effective in the chamber formed by the recesses 52, 54 by way of the communication over the path 74, 54, 94, 92 and the cut off or bored portion of the pressure capsule, and by way of the seals effected about the periphery of the capsule, so that the effects of moisture on the leads of the capacitance are overcome. Sealing beads may also be provided in the gasket 50 about the apertures through which the leads 76 extend toward the circuit board 38, as illustrated in FIG. 12, to further protect these leads from the effects of moisture and a resulting capacitance drift.

The gasket 124 illustrated in FIGS. 11 and 12 may be utilized in place of the gasket 50 in FIG. 2 such that the surface illustrated in the drawing faces toward the mounting plate with the bead structure 134 sealingly engaging the respective peripheral portion of the capsule 56 which has been superimposed thereon in phantom.

Referring to FIGS. 9–12, an assembly may be provided in which the mounting plate 14' receives the gasket 116 in the countersunk portion 114 of the recess 112, it being noted in this embodiment the gasket 116 comprises a bead structure 139 which seals against the mounting plate 14'. Similarly, the gasket 124 includes an annular bead structure 141 which seals against a flat surface of a substrate 140 about the edge of a recess 142. It should be noted that the gasket 124 includes a passageway which is in communication with the passageway 74 by way of the recess 112 and the bore or removed portion 138 of the capsule 56 so that the recess 142 is provided with the same pressure as the recess 112. Attention is also drawn to the fact that the gasket 124 includes a plurality of apertures 126 for receiving the staking posts 48 therethrough, and a pair of apertures 128, each having a peripheral sealing bead, for receiving the capacitance leads therethrough and providing additional sealing for the same.

Inasmuch as the bead structure illustrated in FIG. 8 is typical of the type of bead structure which may be employed for the beads 139, and 141 in FIG. 12, a detailed showing of these beads is not made herein and other suitable beads may be employed to provide the sealing function.

The substrate 42 of FIG. 2 or 140 of FIG. 12 is advantageously constructed from a dielectric material, such as Valox 420 manufactured by the General Electric Company. The mounting plate may be constructed of any suitable material, such as zinc, die cast SAE 903. The housing may also be constructed of any suitable material such as an electrogalvanically bonded steel such as ASTM A620 DDAK, with a minimum zinc thickness of 0.0005/0.013. The gaskets may advantageously be formed of a rubber, such as ASTM D-2000, 2 FC 305 A 19B 37 E 16 F1–11.

Although a grommet 20 has been illustrated for sealing the power and output lead opening 22, other sealing means may be employed, such as a flange carrying an O-ring pressed against the inner surface of the housing with an E or C-type fastener disposed in a locking groove on the exterior side of the housing urging the O-ring into sealing engagement with the inner surface of the housing.

Although I have described my invention by reference to particular exemplary embodiments thereof, many changes and modifications of the invention may become apprarent to those skilled in the art without departing from the spirit and scope of the invention. I therefore intend to include within the patent warranted hereon all such changes and modifications as may reasonably and properly be included within the scope of my contribution to the art.

I claim:

1. Pressure transducer apparatus comprising:
   a pressure capsule including a pair of capacitances which are variable in response to pressure;
   chamber forming means defining a sealed chamber including a port for connection in fluid communication with a pressure to be detected, said capsule mounted in and dividing said chamber into two parts, said port opening into one of said chamber parts;

an electric circuit connected to said capacitances and responsive to the capacitance thereof to produce an output signal indicative of the detected pressure;

resilient means mounting said capsule in said chamber to prevent capacitance changes in response to deliterious environmental changes; and a fluid passageway extending through said resilient means to connect said two parts of said chamber in fluid communication so that each of said capacitances is subjected to the same pressure.

2. The pressure transducer of claim 1, wherein:
said chamber forming means includes a first plate and a second plate secured parallel to said first plate, at least one of said plates including a recess receiving said capsule.

3. The pressure transducer of claim 2, wherein:
said resilient means includes gasket means secured between said first and second plates and securing the peripheral edge of said capsule.

4. The pressure transducer of claim 3, comprising:
bead means sealing said first and second plates and said gasket means.

5. The pressure transducer of claim 2, wherein:
said electrical circuit comprises a circuit board supported by said second plate.

6. The pressure transducer of claim 5, wherein:
said pressure capsule comprises a pair of capacitor leads, said leads extending through said gasket means and said second plate and connected to said electrical circuit.

7. The pressure transducer of claim 6, comprising:
a metal housing about at least the peripheral edges of said first and second plates, said gasket means and said electrical circuit, said first plate forming a cover for said housing.

8. A pressure transducer comprising:
a metal housing;
a first plate forming a cover for said housing, said first plate including a stem extending therefrom and including a passageway therethrough for connection in fluid communication with a pressure supply;
a first recess in said first plate connected in fluid communication with said passageway;
a second plate extending parallel to and connected to said first plate, said second plate including a second recess facing said first recess;
a pressure capsule including a pair of fixed capacitor plates and a pair of respective pressure responsive movable capacitor plates forming a pressure responsive capacitance;
gasket means mounting said capsule in said first and second recesses;
communication means extending through said gasket means connecting said first and second recesses in fluid communication; and
an electrical circuit mounted within said housing, said electrical circuit including output connections extending through said housing and connected to and responsive to said capacitance to provide output signals on said output connections indicative of the sensed pressure.

9. The pressure transducer of claim 8, comprising:
bead means sealing said first and second plates and said gasket means and said capsule.

10. The pressure transducer of claim 8, wherein:
said first plate includes a first bead structure for sealingly engaging said gasket means; and
said second plate includes a second bead structure for sealingly engaging said gasket means.

11. The pressure transducer of claim 8, wherein:
said gasket means includes first and second bead structures for sealingly engaging said capsule and said first and second plates.

12. The transducer of claim 8, wherein:
said gasket means includes a first gasket mounted in said first recess; and
a second gasket between said first plate and first gasket and said second plate.

13. The transducer of claim 8, wherein:
said gasket means includes a first gasket mounted in said first recess; and
a second gasket between said first plate and first gasket and said second plate.

14. The transducer of claim 13, wherein:
said first gasket comprises first beads for sealingly engaging said second gasket and second beads for sealingly engaging said capsule.

15. The transducer of claim 14, wherein:
said second gasket comprises third beads for sealingly engaging said capsule.

16. A pressure transducer comprising:
a metal housing;
a first plate forming a cover for said housing, said first plate including a stem extending therefrom and including a passageway therethrough for connection in fluid communication with a pressure supply;
a first recess in said first plate connected in fluid communication with said passageway;
a second plate extending parallel to and connected to said first plate, said second plate including a second recess facing said first recess;
a pressure capsule including a pair of fixed capacitor plates and a pair of respective pressure responsive movable capacitor plates forming a pressure responsive capacitance;
gasket means mounting said capsule in said first and second recesses;
communication means connecting said first and second recesses in fluid communication; and
an electrical circuit mounted within said housing, said electrical circuit including output connections extending through said housing and connected to and responsive to said capacitance to provide output signals on said output connections indicative of the sensed pressure,
said gasket means including a first gasket mounted in said first recess, a second gasket between said first plate and said first gasket and said second plate, said first gasket comprising first beads for sealingly engaging said second gasket and second beads for sealingly engaging said capsule.

17. The transducer of claim 16, wherein:
said second gasket comprises third beads for sealingly engaging said capsule.

18. A pressure transducer comprising:
a metal housing;
a first plate forming a cover for said housing, said first plate including a stem extending therefrom and including a passageway therethrough for connection in fluid communication with a pressure supply;
a first recess in said first plate connected in fluid communication with said passageway;

a second plate extending parallel to and connected to said first plate, said second plate including a second recess facing said first recess;

a pressure capsule including a pair of fixed capacitor plates and a pair of respective pressure responsive movable capacitor plates forming a pressure responsive capacitance;

gasket means mounting said capsule in said first and second recesses;

communication means connecting said first and second recesses in fluid communication; and an electrical circuit mounted within said housing, said electrical circuit including output connections extending through said housing and connected to and responsive to said capacitance to provide output signals on said output connections indicative of the sensed pressure, said pressure capsule including an insulating plate carrying said movable capacitor plates on opposite sides thereof, said gasket means including a pair of gaskets each including a central aperture receiving a respective movable plate and a radially extending passageway aligned axially of the transducer with the light passageway of the other gasket, and said pressure capsule includes a fluid communication portion connecting said radially extending passageway.

19. A pressure transducer comprising:

a pressure sensing capsule including a pressure responsive capacitance having electrical leads extending therefrom;

shielding means about said pressure capsule shielding said capacitance from capacitive influences of the environment, including a housing and a housing cover, said cover including a fluid passageway therethrough for communication with a pressure supply to be detected;

a dielectric member receiving said leads therethrough, said dielectric member and said cover including portions defining a chamber for said pressure capsule;

sealing means about the periphery of said pressure capsule dividing said chamber into two sections and cooperating with said cover and said dielectric member to seal the chamber from the environment and from the remainder of said housing;

means extending through said sealing means and connecting said two sections of said chamber in fluid communication with said fluid passageway of said cover; and an electronic circuit connected to said leads and mounted in the remainder of said housing, said electronic circuit including output leads extending through said housing and operable in response to the capacitance of said pressure capsule to produce an output signal indicative of sensed pressure on said output leads.

20. A pressure transducer comprising:

a pressure capsule including a planar member and at least one capacitance carried on said planar member and variable in response to pressure;

an electrical circuit connected to said capacitance and operable to produce an output signal indicative of the pressure applied to said pressure capsule;

a first plate including a plurality of stakes extending therefrom, each of said stakes including a reduced diameter end portion and a shoulder;

a second plate including a plurality of apertures therethrough receiving respective ones of said reduced diameter end portions of said stakes therethrough;

at least one of said plates including a recess therein forming a pressure chamber for said pressure capsule;

at least one of said plates including a fluid passageway therethrough for connection in fluid communication with a pressure supply; and resilient means between said first and second plates engaging and mounting said capsule in said chamber, whereby the distal ends of said reduced diameter end portions may be radially deformed to secure said capsule between said plates with a minimum of axial pressure to minimize warping of said planar member and changes in capacitance.

21. A pressure transducer comprising:

a pair of plates each including a recess therein facing the recess of the other, one of said plates including an opening therethrough for connection to a source of pressure, a pressure capsule including a substrate and a pair of pressure responsive movable diaphragms mounted on opposite sides of said substrate, sealing means between said plates sealingly engaging opposite sides of said substrate to mount said capsule with said diaphragms disposed and sealed in respective ones of said recesses, a passageway connecting said recesses in fluid communication, said passageway including radially and axially extending openings in said sealing means.

22. The pressure transducer of claim 21, wherein:

said sealing means comprises a first gasket engaging one of said plates and having a central aperture and a sealing bead structure about said aperture engaging one side of said substrate, a second gasket engaging said first gasket and the other of said plates and having a central aperture and a sealing bead structure about said aperture, and said passageway comprises a coextensive opening in each of said gaskets extending from the respective central aperture through and to a point radially outside of the respective bead structure, and an opening in said substrate outside of the bead structures communicating said coextensive openings.

23. A pressure transducer comprising:

means forming a chamber for connection to a source of pressure to be detected;

a pressure capsule including a substrate and a pair of pressure responsive movable diaphragms mounted on opposite sides of said substrate;

sealing means mounting said substrate within said chamber and dividing said chamber into two sealed sections; and means connecting said two sections in fluid communication including passage means extending through said sealing means from one of said sections to the other.

24. A pressure transducer comprising:

a pair of plates each including a recess therein facing the recess of the other, one of said plates including an opening therethrough for connection to a source of pressure;

a pressure capsule including a substrate and a pair of pressure responsive movable diaphragms mounted on opposite sides of said substrate, sealing means carried by said plates sealingly engaging opposite sides of said substrate to mount said capsule with said diaphragms disposed and sealed in respective ones of said recesses; and a passageway connecting said recesses in fluid communication, said passageway including openings extending through said sealing means.

25. The pressure transducer of claim 24, wherein said sealing means includes marginal edges about said recesses on each of said plates, said marginal edges carrying a sealing bead structure.

26. The pressure transducer of claim 24, wherein said sealing means includes marginal edges about said recesses on each of said plates, said marginal edges carrying a plurality of sealing beads.